United States Patent Office 2,748,097
Patented May 29, 1956

2,748,097

POLYACRYLONITRILE SOLUTIONS CONTAINING GELATION INHIBITORS

Donald Olcott Niederhauser, Wilmington, Del., assignor to E. I. du Pont de Nemours and Company, Wilmington, Del., a corporation of Delaware No Drawing. Application March 19, 1953,
Serial No. 343,515

14 Claims. (Cl. 260—30.2)

This invention relates to improved solution stability of acrylonitrile polymers and of copolymers predominantly of acrylonitrile. More particularly, this invention is directed to inhibiting gelation of solutions of polyacrylonitrile and copolymers composed of at least 85% polyacrylonitrile.

Acrylonitrile polymers and copolymers containing at least 85% acrylonitrile are difficultly soluble. Even in dimethylformamide, one of the better known solvents, solution at satisfactory concentration levels for evaporative spinning is effected only at elevated temperatures, such as above 100° C. When such solution is maintained at elevated temperatures for a period of time, the solution viscosity increases gradually at first and then more rapidly until after a number of hours gelation of the solution takes place. Under normal operating conditions a 23% solution of polyacrylonitrile in dimethylformamide maintained at a temperature of 125° C. will increase in viscosity tenfold in about 60 hours and will set to a rigid gel within a few hours thereafter. This time at which the solution has increased in viscosity by a factor of 10 will hereinafter be referred to as the "gel time" of the solution.

The gelation of spinning solutions of polyacrylonitrile and of copolymers containing at least 85% polyacrylonitrile is a very serious problem in the production of high quality filaments, fibers, yarns and similar articles. Deposits of gel are known to form on the walls of equipment handling spinning solutions, and small pieces of gel that work loose from the walls or that form in stagnant areas cause non-uniformities in the spun structures and seriously affect subsequent drawings as is evidenced by poor continuity of drawing and lowered quality in the fiber product produced. It is, therefore, extremely important that some way of increasing gel time of spinning solutions be provided.

Accordingly, an object of this invention is to provide adjuvants for organic solutions of polyacrylonitrile and of copolymers containing at least 85% acrylonitrile. Another object is the modification of solutions of such polymers in a solvent containing a dimethyl carbamyl group such as dimethyl formamide, whereby the "gel time" of the solution is materially increased. Other objects will be apparent from the description that follows.

After extensive research and testing it was found that certain adjuvants would effectively inhibit gelation of the spinning solutions.

The desired inhibition is obtained by this invention by incorporating in the solution of polyacrylonitrile, or in solutions of its copolymers containing at least 85% acrylonitrile, a small amount of a compound soluble in the solution and defined by the following general formula:

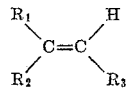

where $R_1$ and $R_2$ are electropositive elements or groups, such as hydrogen, alkyl, or aryl, while $R_3$ is an electronegative group containing nitrogen and connected to the unsaturated carbon by means of a carbon atom. Some compounds conforming to this structure and effective in inhibiting gelation of acrylonitrile polymer solutions are as follows:

$$H_2C=CHCN$$
Acrylonitrile $$CH_3CH=CHCH=CHCN$$
Sorbonitrile $$CH_3CH_2C=CHCN$$
beta-Ethylacrylonitrile $$(CH_3)_2CHCH=CHCN$$
beta-Isopropylacrylonitrile $$C_6H_5CH=CHCN$$
beta-Phenylacrylonitrile $$(CH_3)_2C=CHCN$$
beta-Methyl crotonic nitrile

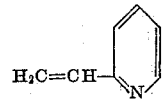

2-vinylpyridine

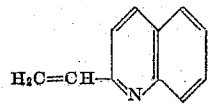

2-vinylquinoline $$H_2C=CH-CH=CHCN$$
1-cyano-1,3-butadiene

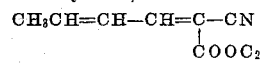

Condensation product of crotonaldehyde and cyanoacetic ethyl ester

It is essential that the unsaturated carbon, to which the electronegative group containing nitrogen is attached through carbon, also holds a hydrogen atom. For instance, acrylonitrile is very effective as a gelation inhibitor but methacrylonitrile

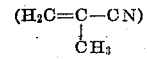

has no beneficial effect on the gel time of the solution. In the last structural formula given above the electronegative group is $CH=C(COOC_2H_5)CN$. All of the compounds listed above and all others within the structural formula give effective results similar to those given in the examples below when used as gelation inhibitors in the process of this invention.

Generally, only a small quantity of adjuvant is necessary to increase the gel time substantially and in many instances as little as 0.2% of the gelation inhibitor, based on the total weight of the solution, or about 0.8% based on the weight of the polymer in the solution, is sufficient to increase the gel time noticeably. On the other hand, when a long gel time of the solution is desired, as much as 2.5% adjuvant, by weight based on the solution, or 10% or more based on the polymer, may be used to good advantage. In the shaping of articles, the solutions contain an amount of polymer dependent in part on the article to be formed. Generally, the solutions contain about 5% to about 40% of polymer by weight, though higher or lower amounts can be used. Preferably in fiber formation the solutions contain about 10% to 35% of the polymer.

The following examples are given to illustrate this invention further without any intention of being limited thereby. Parts and percentages are given by weight.

EXAMPLE I

A solution was prepared consisting of 23% polyacrylonitrile, 76% dimethylformamide and 1% acrylonitrile and heated in a sealed tube at 125° C. for 1204 hours before a tenfold increase in viscosity was obtained.

In a control experiment, a 23% solution of polyacrylonitrile in dimethylformamide showed a tenfold viscosity increase in 78 hours and the solution set to a rigid gel in 85 hours.

EXAMPLE II

A solution consisting of 23% polyacrylonitrile, 76.8% dimethylformamide and 0.2% acrylonitrile when heated in a sealed tube did not reach its gel time for 132 hours.

EXAMPLE III

A series of solutions was prepared using 23 parts by weight of polyacrylonitrile in each case, and 77 parts of dimethylformamide containing about 0.25% water plus the amount of acrylonitrile specified in Table I.

Some of these solutions were tested in loosely stoppered tubes and some were tested in ground glass stoppered tubes. In all cases the solutions were maintained at 125° C. until the solution viscosity had increased by a factor of ten, which time is designated "gel time." It is to be noted from the data contained in Table I that acrylonitrile is less effective as a gelation inhibitor in the presence of air and water, but even in their presence a very appreciable effect on the gelation rate is obtained. Under the conditions of this test, unmodified 23% polyacrylonitrile solution in dimethylformamide containing about 0.25% water showed a gel time of about 60 hours.

Table I

| Parts of Acrylonitrile | Gel Time In Hours | |
|---|---|---|
| | In Loosely Stoppered Tubes | In Glass Stoppered Tubes |
| 0.23 | 88 | 110–120 |
| 0.46 | | ca. 160 |
| 0.57 | 125 | |
| 0.69 | 161 | |
| 0.92 | | 300 |
| 1.15 | 190, 220 | |
| 2.30 | 339 | |

From these results one will see that if he desires to store solutions without protecting them from atmospheric conditions, he will wish to use somewhat larger amounts of the adjuvant than he would use if the solutions were not exposed to air and water, as for example in piping solutions from one place to another in a spinning area.

EXAMPLE IV

A series of acrylonitrile copolymers was prepared wherein the monomer feed to the polymerizer contained about 5% of a copolymerizing monomer and about 95% acrylonitrile. All of these copolymers contained at least 85% acrylonitrile and the balance the other copolymerizing material indicated, probably in the range of from 4% to 8% of that material. These copolymers were separately dissolved in dimethylformamide containing about 0.25% water to form 23% solutions of copolymer and the gel time was determined while maintaining the solution at 125° C. The results "gel time in hours" are contained in Table II in the column headed "Control." Similar solutions consisting of 23% by weight of copolymer, 76.54% of dimethylformamide containing about 0.25% water and 0.46% of acrylonitrile monomer were prepared and tested under identical conditions. The results "gel time in hours" are listed in Table II in the column headed "With AN." As can be observed from these data, all the acrylonitrile modified solutions exhibit very substantial increases in gel time.

Table II

| Copolymer | Gel Time in Hours | |
|---|---|---|
| | Control | With AN |
| Acrylonitrile/methylacrylate | 59 | 143 |
| Acrylonitrile/2-vinyl pyridine/vinyl acetate | 31 | 180 |
| Acrylonitrile/N-tertiary octyl acrylamide | 47 | 132 |
| Acrylonitrile/2-butoxyethyl methacrylate | 44 | 137 |
| Acrylonitrile/vinyl methane sulfonate | 125 | 170 |

EXAMPLE V

Twenty-three parts of acrylonitrile polymer was dissolved in 77 parts of N,N-dimethyl acetamide and maintained at a temperature of 125° C. for 150 hours, at the end of which time the solution viscosity had increased tenfold. A similar solution containing 23% acrylonitrile polymer, 76.54% N,N-dimethyl acetamide and 0.46% acrylonitrile monomer and maintained at a temperature of 125° C. did not reach its gel time until 240 hours had passed.

EXAMPLE VI

Solutions consisting of 23% polyacrylonitrile, 76% of dimethylformamide containing about 0.25% water, and 1% of (a) 2-vinyl pyridine, (b) 1-cyano-1, 3-butadiene, (c) the condensation product of crotonaldehyde and cyanoacetic ethyl ester and (d) beta-ethyl acrylonitrile were prepared and subjected to heating at 125° C. for 80 hours at which time a viscosity determination of each of the four solutions showed less than a tenfold increase whereas a control solution (23% polyacrylonitrile and 77% of dimethylformamide containing about 0.25% water) under identical conditions of testing reached a tenfold increase in viscosity in about 60 hours.

EXAMPLE VII

A solution prepared from 15 parts of polyacrylonitrile and 85 parts of tetramethylene sulfone when heated in a sealed tube under air-free conditions at a temperature of 140° C. reached its "gel time" in 37 hours. Similar solutions containing additionally 0.75 part and 1.5 parts of acrylonitrile when heated under identical conditions did not reach their "gel times" until 151 hours and 470 hours had passed, respectively.

EXAMPLE VIII

A solution consisting of 13.6% polyacrylonitrile, 1.3% of acrylonitrile and 85.1% of freshly distilled butyrolactone when heated in a sealed tube under air-free conditions at a temperature of 140° C. did not reach its "gel time" until 160 hours had passed. A control solution consisting of 13.6% polyacrylonitrile and 86.4% of freshly distilled butyrolactone when heated in a sealed tube under identical conditions reached its "gel time" in 59 hours.

EXAMPLE IX

A solution prepared from 17.7 parts of acrylonitrile polymer, 82.3 parts of ethylene cyclic carbonate, and 2 parts of acrylonitrile when heated in a loosely stopped tube did not reach its "gel time" until 160 hours had passed. A control solution free of acrylonitrile reached its "gel time" in 60 hours.

The invention has been described primarily with respect to N,N-dimethylformamide solutions of polyacrylonitrile, since this solvent is widely used and gelation inhibition in such solutions is urgently needed. However, numerous other solutions involving other solvents may be improved in gel time by the practice of this invention as shown in the above examples. Still further, solutions disclosed in U. S. Patents 2,404,714 to 2,404,727 will be benefited by the practice of this invention as are N,N-dimethyl acetamide solutions of acrylonitrile polymers and of copolymers containing at least 85% acrylonitrile.

The invention is applicable not only to the homopolymer and the specific copolymers above mentioned but to many other copolymers, such as those mentioned in U. S. Patent 2,436,926, and the copolymers may contain two or more components.

By the practice of this invention the length of time which solutions of acrylonitrile polymers can be held in tanks, pipe lines, or other equipment prior to spinning or otherwise shaping into products is greatly increased. Moreover, when the hold-up time is not changed, the character of the solution modified in accordance with this invention is so much improved that gel deposits on the walls of the containers are substantially eliminated and as a consequence, gel particles are not picked up in the flowing stream to produce heterogeneity in the fibers or other structures initially formed. This is a great advantage, for breaks and irregularities in subsequent drawing of these fibers are greatly reduced. Furthermore, the drawn filamentary products from these improved solutions are more uniform in physical and dyeing properties.

Any departure which conforms to the principles of this invention is intended to be included within the scope of the claims below.

I claim.

1. A process for increasing the gelation time at temperature of at least 100° C. of a solution of an acrylonitrile polymer formed from monoethylenically unsaturated monomeric material and containing in the polymer molecule at least 85% of acrylonitrile by weight, comprising adding to said solution about 0.2% to about 2.5%, based on the weight of said solution, of a compound soluble in said solution and corresponding to the following formula

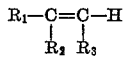

wherein $R_1$ and $R_2$ are from the group consisting of hydrogen and alkyl and aryl radicals, and $R_3$ is linked to the rest of the molecule by a carbon-to-carbon bond and is from the group consisting of nitrile and N-heterocyclic radicals.

2. A process in accordance with claim 1 wherein said compound is acrylonitrile.

3. A process in accordance with claim 1 wherein said compound is a sorbonitrile.

4. A process in accordance with claim I wherein said polymer is polyacrylonitrile.

5. A process in accordance with claim 1 wherein said polymer is a copolymer.

6. A process in accordance with claim 1 wherein said polymer is dissolved in N,N-dimethylformamide.

7. A process in accordance with claim 1 wherein said polymer is in solution in N,N-dimethylacetamide.

8. A process in accordance with claim 1 wherein said polymer is in solution tetramethylene cyclic sulfone.

9. A process in accordance with claim 1 wherein said polymer is in solution in gamma-butyrolactone.

10. A process in accordance with claim 1 wherein said polymer is in solution in ethylene cyclic carbonate.

11. A process in accordance with claim 1 wherein said compound is a nitrile.

12. A process in accordance wtih claim 1 wherein said solution contains about 5% to about 40% of said polymer.

13. A process in accordance with claim 1 wherein said compound is a vinyl pyridine.

14. A process in accordance with claim 1 wherein said compound is a vinyl quinoline.

References Cited in the file of this patent

UNITED STATES PATENTS

| | | |
|---|---|---|
| 2,528,710 | Richards | Nov. 7, 1950 |
| 2,549,913 | Lytton | Apr. 24, 1951 |
| 2,650,151 | Ham | Aug. 25, 1953 |